June 2, 1925.
W. W. WAYLAND
1,540,507
VERMINPROOF BREAD BOX AND CUTTING BOARD
Filed July 28, 1922
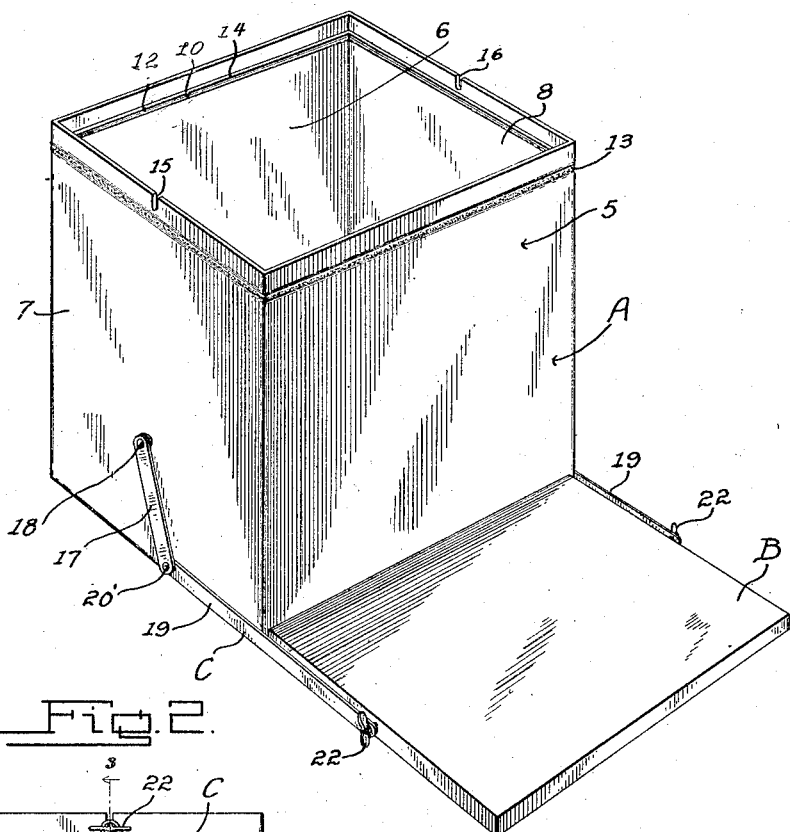
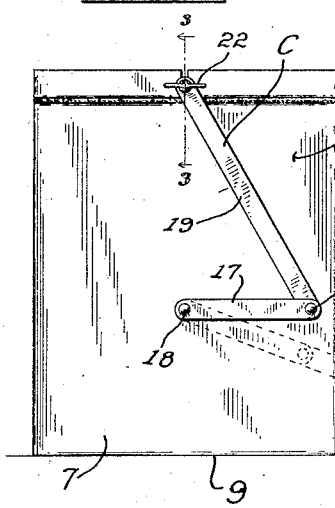
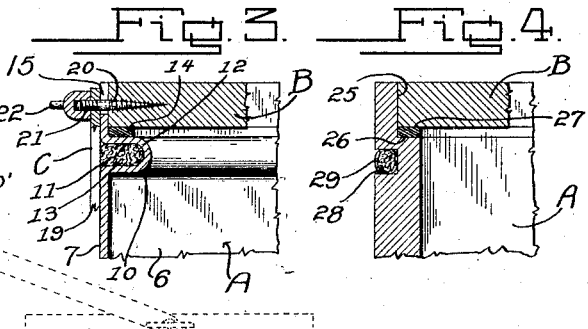
Inventor
William W. Wayland
By [signature]
Attorneys Patented June 2, 1925.

1,540,507

UNITED STATES PATENT OFFICE.

WILLIAM W. WAYLAND, OF CORDOVA, ALABAMA.

VERMINPROOF BREAD BOX AND CUTTING BOARD.

Application filed July 28, 1922. Serial No. 573,265.

*To all whom it may concern:*

Be it known that I, WILLIAM W. WAYLAND, a citizen of the United States, residing at Cordova, in the county of Walker and State of Alabama, have invented certain new and useful Improvements in Verminproof Bread Boxes and Cutting Boards, of which the following is a specification.

This invention relates to receptacles and the primary object of the invention is to provide a novel cake and bread box embodying a novel closure plate, which when swung to its inoperative open position can be used as a cutting board.

A further object of the invention is to provide a novel means for operatively connecting the cutting board or closure plate with the box, so that the board can be swung down flush with the lower wall of the box either in engagement with the front wall of the box in spaced relation thereto.

A further object of the invention is to provide an improved bread or cake box embodying a combined cutting board and closure plate, a novel means for connecting the closure plate and board with the box, said means including pivotally connected links connected respectively with the body of the box and with the cutting board at a point intermediate its front and rear edges.

A further object of the invention is to provide a novel means for associating the combined closure plate and cutting board with the box, so that an air and vermin proof closure will be formed, and means for connecting the combined closure plate and cutting board with the links, in a novel manner to form means for securing the combined closure plate and board to the body of the box so as to prevent accidental movement thereof.

A further object of the invention is to provide an improved cake or bread box which is so constructed, that the entrance of vermin into the box will be prevented, said box having a groove formed therein for the reception of a suitable wick or the like containing an ant preventative.

A still further object of the invention is to provide an improved bread and cake box of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, forming a part of this specification, in which drawing.

Figure 1 is a perspective view of the improved box showing the cover plate therefor in its open position for acting as a cutting board.

Fig. 2 is a side elevation of the improved box with the combined closure plate and cutting board in its closed operative position, and showing in dotted lines the position to which the combined cover plate and board can be moved when cutting large loaves of bread and the like.

Fig. 3 is an enlarged detail vertical section taken on the line 3—3 of Fig. 2 showing the formation of the box and the means for connecting the combined closure plate and cutting board with the swinging links.

Fig. 4 is an enlarged fragmentary section through the upper end of the box when constructed wholly of wood.

Referring to the drawings in detail, wherein similar reference characters designate corresponding parts throughout the several views the letter A generally indicates the body portion of the improved box; B the combined closure plate and board therefor and C the novel means for connecting the combined closure plate and cutting board with the body portion A of the box.

The body portion A of the box can be constructed either of metal or wood and as shown in Figures 1 to 3 inclusive of the drawing the body A is constructed of metal, while in Figure 4 of the drawing is shown the body portion A constructed of wood.

The body A includes front and rear walls 5 and 6, the side walls 7 and 8 and a bottom wall 9. The upper end of the body A is left entirely open and is adapted to be closed by the novel combined closure plate and cutting board B.

When the body A is constructed of sheet metal the walls 5, 6, 7 and 8 have struck therein adjacent to the upper edges thereof a bead 10 which forms a marginal groove 11 around the box A and a shoulder 12 on which the closure plate or cutting board B is adapted to rest. The groove 11 is adapted to receive a suitable wick or packing 13 which can be formed of woven wool or cord if so desired. This wick or packing 13 is adapted to be impregnated with a suitable ant preventor so as to prevent the crawling up of ants on the walls 5, 6, 7 and 8 into the interior of the box.

The shoulder 12 can receive a suitable packing strip of rubber or the like 14 and the closure plate and cutting board B is adapted to rest upon the strip and thus form an air tight closure with said box. The side walls 7 and 8 have their upper edges at the transverse center thereof provided with notches 15 and 16, the purpose of which will be hereinafter more fully described.

The combined closure plate and cutting board B is of course preferably formed of wood and is of a size as to fit snugly within the upper open end of the body A and for resting on the packing strip 14.

The novel means C for connecting the combined closure plate and cutting board B to the body A comprises a pair of relatively short links 17 which are secured to the outer faces of the side walls 7 and 8 of the body A by means of pivot pins or the like 18. The outer ends of the links 17 are in turn pivotally connected to the relatively long links 19 by means of pivot pins 20'. The outer ends of the relatively long links 19 are rotatably mounted upon suitable pins 20 which are threaded or otherwise anchored in the side edges of the combined closure plate and cutting board B at the longitudinal center thereof and these pins 20 are adapted to fit in the notches 15 and 16 when the closure plate B is disposed within the body A. The outer terminals of these pins 20 are externally threaded as at 21 for the reception of winged nuts 22 and it can be seen that when the closure plate B is in its position for closing the top of the body A that the thumb or winged nuts 22 can be threaded on the pins 20 for impinging against the long links 19 for forcing the same into friction tight engagement with the walls 7 and 8 and thus preventing movement of the said combined cover plate and cutting board B.

When it is desired to gain access to the box for removing or placing articles therein it is merely necessary to loosen the winged nuts 22 on the pins 20 and pull up on said nuts as handles, which will effectively raise the cover plate and cutting board from off of the body A.

When it is desired to use the board as a rest for cutting bread and the like the same is swung forwardly and downwardly to a position shown in Figure 1 of the drawing. If desired the board B can be pulled forwardly in spaced relation to the front wall 5 of the body A as shown in dotted line position in Figure 2 of the drawing.

When the body A of the box is formed of wood the inner surface of the walls thereof at their upper ends are rabbeted as at 25 to form a shoulder 26 and the closure plate B is adapted to rest upon the said shoulder. It being understood of course that a packing strip 27 can be placed upon the shoulder for forming a seat for the cover B. As clearly shown in Figure 4 of the drawing when the box body A is made of wood the outer surface of the walls thereof are grooved as at 28 for the reception of the wick or packing 29 which receives the ant preventative.

From the foregoing description it can be seen that an improved receptacle has been provided for bread, cake and the like which is so constructed that the access of ants or other vermin thereto will be precluded and that the contents thereof will always be maintained fresh, the closure plate of the box also acting as a cutting board for bread or cake.

Owing to the means of connecting the board or closure plate B with the links 19 it can be seen that the board B can be turned over so as to bring the cutting surface thereof into active position when the board is placed in position for cutting bread and that this surface can be turned so as to position the cutting surface lowermost when the closure plate and board is moved to its position for closing the upper open end of the box or body A.

Changes in details may be made without departing from the spirit or the scope of this invention; but,

I claim:

1. In a bread and cake box, a relatively large receptacle body having an upper open end, a combined closure plate and cutting board, and links connecting said plate at its longitudinal center to said body, said links of a length to permit movement of said plate over the upper end of the body and for movement in front of said body.

2. In a bread and cake box, a body having an upper open end, a combined closure plate and cutting board for fitting in the open upper end of the body and links pivotally connected together and having their opposite ends pivotally attached to the body and combined closure plate and cutting board respectively in a manner as to permit of the combined closure and cutting board to be moved upwardly and then downwardly at either the front or rear wall of said body.

3. In a bread box, a body having an upper open end, an internal shoulder formed in the body, a combined cover plate and cutting board adapted to fit in the open end of the body and resting on said shoulder, and linked means for pivotally connecting said cover plate and cutting board with the body for permitting the board to be moved upwardly and downwardly at right angles to the front wall of the body.

4. In a bread and cake box, a body having an upper open end, a combined closure plate and cutting board for the upper open end of the body, a pair of relatively short links pivotally connected to the side walls of the body adjacent to the lower ends thereof, a pair of relatively long links pivotally connected to the outer ends of the short links and means pivotally connecting the outer ends of the relatively long links to the combined closure plate and cutting board.

5. In a bread or cake box, a body having an upper open end, the side walls of the body being provided with tranversely aligned notches, a combined closure plate and cutting board for fitting in the upper open end of the body, outwardly extending pivot pins carried by the side edges of the combined closure plate and cutting board, links pivotally connected together, means connecting the lower terminals of the links to the body, and means for mounting the upper terminals of the links upon said pins, the pins being adapted to fit in said notches when the combined closure plate and cutting board is in its position on said body, and thumb nuts threaded upon said pins for holding the cover plate or cutting board in operative position on said body.

6. In a bread box, a body having an upper open end, and provided with a groove extending around the outer surface thereof, a packing impregnated with a vermin preventor disposed in said groove, an internal shoulder formed in said body adjacent to the upper end thereof and a pivoted closure plate and cutting board carried by the body for resting upon said shoulder.

WILLIAM W. WAYLAND.